United States Patent [19]

Krishnan et al.

[11] 4,426,514

[45] Jan. 17, 1984

[54] COPOLYCARBONATE FROM THIODIPHENOL HAVING HIGH MELT FLOW RATES

[75] Inventors: Sivaram Krishnan; Arthur L. Baron, both of New Martinsville, W. Va.

[73] Assignee: Mobay Chemical Corporation, Pittsburgh, Pa.

[21] Appl. No.: 168,857

[22] Filed: Jul. 14, 1980

[51] Int. Cl.$^3$ ............................................. C08G 63/62
[52] U.S. Cl. ..................................... 528/204; 528/196
[58] Field of Search ................................. 528/204, 196

[56] References Cited

U.S. PATENT DOCUMENTS

| | | | |
|---|---|---|---|
| 3,112,292 | 11/1963 | Bottenbruch et al. | 260/47 |
| 3,250,744 | 5/1966 | Schnell et al. | 528/196 |
| 3,398,212 | 8/1968 | Jackson et al. | 528/204 |

OTHER PUBLICATIONS

English Language Translation of French Document No. 2377267.

*Primary Examiner*—Harold D. Anderson
*Attorney, Agent, or Firm*—Gene Harsh; Lawrence S. Pope; Aron Preis

[57] ABSTRACT

The invention is directed to copolycarbonates of thiodiphenol characterized by high melt flow rate and good mechanical properties, particularly suitable for molding at temperatures lower than 500° F.

4 Claims, No Drawings

COPOLYCARBONATE FROM THIODIPHENOL HAVING HIGH MELT FLOW RATES

BACKGROUND OF THE INVENTION

1. Field of the Invention

This invention relates to polycarbonate copolymers and methods of their molding, and more particularly, to copolycarbonates of thiodiphenol having high melt flow rates and excellent physical properties.

2. Description of the Prior Art

Polycarbonates derived from reactions involving organic dihydroxy compounds and carbonic acid derivatives have found extensive commercial application because of their excellent mechanical and physical properties. These thermoplastic polymers are particularly suited for the manufacture of molded articles where impact strength, rigidity, toughness, thermal and dimensional stability as well as excellent electrical properties are required.

However, one deficiency of polycarbonate when used in molded articles is their low critical thickness.

It is known that polycarbonate plastics exhibit high notched Izod (ASTM Test D-256) impact values. This value, however, is dependent upon the thickness of the test specimen. Typical notched Izod impact values for a $\frac{1}{8}''$ specimen are about 10 to 16 ft.-lbs. per inch. These high Izod values result because specimens of $\frac{1}{8}''$ thickness are thinner than the critical thickness of the polymer, and are associated with hinged or ductile breaks. On the other hand, a $\frac{1}{4}''$ specimen exhibits a clean or brittle break with a notched Izod impact value of only about 2.5 ft.-lbs. per inch. The $\frac{1}{4}''$ specimens are said to be above the critical thickness of the polymer. "Critical thickness" has been defined as the thickness at which a discontinuity in the graphical representation of Izod impact strength vs. specimen's thickness occurs. In other words, it is the thickness at which a transition from a brittle to a ductile failure takes place. Thus, a standard impact specimen of polycarbonate polymer thicker than the critical thickness exhibits brittle breaks, and those thinner than the critical thickness exhibit hinged or ductile breaks. Further, the critical thickness of a polycarbonate based on bisphenol A with a melt flow of 3 to 6 g/10 min. at 300° C. (ASTM D-1238) has a critical thickness of about 225 mils.

The melt flow rate of a polycarbonate resin is a measure generally of both molecular weight and of processability. A low melt flow rate, i.e., high viscosity, indicates processing difficulties. On the other hand, higher viscosity is also indicative of a high molecular weight which is generally associated with the exceptional chemical and mechanical properties of polycarbonates.

It was thus generally recognized that the desirable properties of polycarbonate are not associated with easy-to-process resins. It has been further recognized that in molding thin parts i.e., less than 20 mils, or in using molds of complicated patterns, a high viscosity polycarbonate cools down and stops flowing before completely filling the mold.

In accordance with the present invention a copolycarbonate is provided wherein combined are a high melt flow rate and excellent mechanical, chemical and physical properties which polycarbonates are noted for. Further disclosed is a method of injection molding a copolycarbonate characterized by its critical thickness being in excess of 200 mils, at less than 500° F. and preferably lower than 485° F. Additionally disclosed is a method for molding an impact resistant copolycarbonate resin characterized by its high critical thickness, into molds having sections thereof thinner than 20 mils and preferably thinner than 5 mils.

BRIEF DESCRIPTION OF THE INVENTION

A copolycarbonate of thiodiphenol of a melt flow higher than 15 g/10 min. and a critical thickness greater than 200 mils comprising at least 20 percent, relative to the weight of diphenol used, of thiodiphenol is described. A method of molding that copolycarbonate at a process temperature lower than 500° F. and preferably lower than 485° F., and a method of molding the copolycarbonate into articles having at least parts thereof thinner than 20 mils and even thinner than 5 mils, substantially free of thermal degradation are described.

DETAILED DESCRIPTION OF THE INVENTION

When used herein, "copolycarbonate resin" means the neat resin without additives; "polycarbonate" means the copolycarbonate resin with additives therein. The copolycarbonate resins of the invention may be prepared by conventional methods for polycarbonate resins, and may have a weight average molecular weight of 20,000 to 30,000, and preferably, a melt flow rate of greater than 15 g/10 min., and more preferably, 15 to 30 g/10 min. at 300° C. (ASTM D-1238).

Any suitable processes, reactants, catalysts, solvents and conditions and the like for the production of the copolycarbonate resins of this invention which are customarily employed in polycarbonate resin synthesis may be used such as disclosed in German Pat. Nos. 1,046,311 and 962,274; U.S. Pat. Nos. 3,028,365; 2,999,846; 3,248,414; 3,153,008; 3,215,668; 3,187,065; 2,964,974; 2,970,137; 2,991,273; and 2,999,835, all incorporated herein by reference. The preferred process is the interfacial polycondensation process. The copolycarbonate resins of the invention are obtained by reacting an aromatic dihydroxy compound and a thiodiphenol represented by the structural formula:

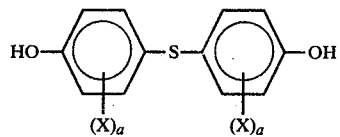

wherein X is an alkyl group having 1 to 4 carbon atoms or is halogen and "a" is 0 to 4 with a carbonic acid derivative.

According to the interfacial polycondensation process copolycarbonate resins are obtained by reacting the aromatic dihydroxy compounds with an alkali metal hydroxide or alkaline earth metal oxide or hydroxide to form the salt of the hydroxy compounds. The salt mixture is present in an aqueous solution or suspension and is reacted with phosgene, carbonyl bromide or the bischloroformic esters of the aromatic dihydroxy compounds. An organic solvent is provided in the reaction admixture which is a solvent for the polymer but not for the aromatic dihydroxy salts. Thus, chlorinated aliphatic hydrocarbons or chlorinated aromatic hydrocarbons are used as the organic solvent which dissolves the condensation product.

In order to limit the molecular weight one may use monofunctional reactants such as monophenols, for example, the propyl-, isopropyl- and butylphenols, especially p-tert.-butylphenol and phenol itself. In order to accelerate the reaction, catalysts such as tertiary amines, quaternary ammonium, phosphonium or arsonium salts and the like may be used. The reaction temperature should be about −20° to +150° C., preferably 0° C. to about 100° C.

According to the polycondensation process in a homogeneous phase, the dissolved reaction components are polycondensed in an inert solvent in the presence of an equivalent amount of a tertiary amine base required for absorption of the generated HCl, such as, e.g., N,N-dimethyl-aniline, N,N-dimethyl-cyclohexylamine or preferably, pyridine and the like. In still another process, a diaryl carbonate can be transesterified with the aromatic dihydroxy compounds to form the polycarbonate resin.

It is to be understood that it is possible to combine in the processes described above in a chemically meaningful way the aromatic dihydroxy compounds, monohydroxy compounds in the form of the alkali metal salts and/or bis-haloformic acid esters, and the amount of phosgene or carbonyl bromide then still required in order to obtain high molecular products. Other methods of synthesis in forming the polycarbonates of the invention such as disclosed in U.S. Pat. No. 3,912,688 incorporated herein by reference may be used.

Suitable aromatic dihydroxy compounds are, for example (4,4'-dihydroxy-diphenyl)-methane; 2,2'-(4,4'-dihydroxy-diphenyl)-propane; 1,1-(4,4'-dihydroxy-diphenyl)-cyclohexane; 1,1-(4,4'-dihydroxy-3,3'-dimethyl-diphenyl)-cyclohexane; 1,1-(2,2'-dihydroxy-4,4'-dimethyl-diphenyl)-butane; 2,2-(2,2'-dihydroxy-4,4'-di-tert.-butyl-diphenyl)-propane or 1,1'-(4,4'-dihydroxy-diphenyl)-1-phenyl-ethane; furthermore, methane derivatives which carry besides two hydroxyaryl groups an alkyl residue with at least two carbon atoms and a second alkyl residue with one or more carbon atoms, such as 2,2-(4,4'-dihydroxy-diphenyl)-butane; 2,2-(4,4'-dihydroxy-diphenyl)-pentane; 3,3-(4,4'-dihydroxy-diphenyl)-pentane; 2,2-(4,4'-dihydroxy-diphenyl)-hexane; 3,3-(4,4'-dihydroxy-diphenyl)-hexane; 2,2-(4,4'-dihydroxy-diphenyl)-4-methyl-pentane; 2,2-(4,4'-dihydroxy-diphenyl)-heptane; 4,4-(4,4'-dihydroxy-diphenyl)-heptane (melting point 148°–149° C.) or 2,2-(4,4'-dihydroxy-diphenyl)-tri-decane. Suitable di-(monohydroxyaryl)-alkanes, the two aryl residues of which are different are, for example, 2,2-(4,4'-dihydroxy-3'-methyl-diphenyl)-propane and 2,2-(4,4'-dihydroxy-3-methyl-3'-isopropyl-diphenyl)-butane. Suitable di-(monohydroxyaryl)-alkanes, the alkyl residue of which, linking the two benzene rings, is substituted by an aryl residue are for instance (4,4'-dihydroxy-diphenyl)-phenyl-methane and 1,1-(4,4'-dihydroxy-diphenyl)-1-phenyl-ethane. Aromatic diols wherein the two aryl residues are linked by a sulfonyl group such as sulfonyl diphenol are also useful.

Suitable dihydroxybenzenes and substituted dihydroxybenzenes are hydroquinone, resorcinol, pyrocatecol, methyl hydroquinone and the like. Other suitable dihydroxy-aromatic compounds are 4,4'-dihydroxy-diphenylene; 2,2'-dihydroxy-diphenylene; dihydroxynaphthalene and dihydroxyanthracene.

The halogenated phenolic diols are also useful in the practice of the invention and are any suitable bishydroxyaryl components such as, for example, the halogen containing bisphenols such as 2,2-(3,3',5'-tetrachloro-4,4'-dihydroxy-diphenyl)-propane; 2,2-(3,5,3',5'-tetrabromo-4,4'-dihydroxy-diphenyl)-propane; 2,2-(3,3-dichloro-4,4'-dihydroxy-diphenyl)-propane; 2,2-(3,5-dichloro-4,4'-dihydroxy-diphenyl)-propane; 2,2-(3,3'-dichloro-5,5'-dimethyl-4,4'-dihydroxy-diphenyl)-propane; 2,2-(3,3'-dibromo-4,4'-dihydroxy-diphenyl)-propane and the like and are represented by the structural formula:

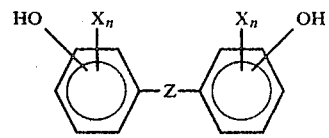

wherein Z is methylene or isopropylidine and X is halogen preferably chlorine or bromine and most preferably bromine and "n" is 1 to 4.

These halogenated diols are incorporated into the polycarbonate at levels sufficient to impart flame retardant characteristics. For example, a halogen content of about 3 to 10% by weight is normally sufficient.

Small amounts of trifunctional or more than trifunctional hydroxy compounds may be reacted in the formation of the polycarbonate resins to branch the polymer chains, preferably, between about 0.05 and 2.0 mole percent (relative to diphenols employed), of trifunctional or more than trifunctional compounds, especially compounds with three or more phenolic hydroxyl groups.

Polycarbonates of this type are described, for example, in German Offenlegungsschriften (German Published Specifications) 1,570,533; 1,595,762; 2,116,974; and 2,113,347; British Patent Specification No. 1,079,821 and U.S. Pat. No. 3,544,514 (incorporated herein by reference).

Some of the examples of compounds with three or more than three phenolic hydroxyl groups which can be used are phloroglucinol; 4,6-dimethyl-2,4,6-tri-(4-hydroxyphenyl)-heptane; [(2,4,6-dimethyl-2,4,6-tri-)4-hydroxyphenyl)-heptane]; 1,4,5-tri-(4-hydroxyphenyl)-benzene; 1,1,1-tri-(4-hydroxyphenyl)-ethane; tri-(4-hydroxyphenyl)-phenyl methane; 2,2-bis-[4,4-bis-(4-hydroxyphenyl)-cyclohexyl]-propane; 2,4-bis-(4-hydroxyphenyl-isopropyl)-phenyl; 2,6-bis-(2-hydroxy-5'-methylbenzyl)-4-methyl phenyl; 2-(4-hydroxyphenyl)-2-(4-hydroxyphenyl)-propane; hexa-(4-(4-hydroxyphenyl-isopropyl)phenyl)ortho-terephthalic acid ester; tetra-(4-hydroxyphenyl)-methane; tetra-(4-(4-hydroxyphenyl-isopropyl)-phenoxy)-methane; and 1,4-bis-(4',4''-dihydroxytriphenyl)-methyl-benzene.

Some of the other trifunctional compounds are 2,4-dihydroxybenzoic acid, trimesic acid, cyanuric chloride and 3,3-bis-(4-hydroxyphenyl)-2-oxo-2,3-dihydroindole.

Copolycarbonates of the invention comprise 20 or more and, preferably, 20 to 40, and most preferably 20 to 25% relative to the weight of the diphenol, of thiodiphenol. They are characterized by a high melt flow rate, i.e. greater than 15 g/10 min., and a consequent improved processability, coupled with exceptional impact performance. The transparency and good color dispersion of polycarbonates are not compromised by copolymerization.

Although copolymers of bisphenols and thiodiphenols are known, (see U.S. Pat. No. 3,250,744) their characteristics and uses describe compositions different from those of the present invention. These prior art copolymers are of a high molecular weight and their use is restricted to molding or coatings having good anchorage. No incentive nor recognition appears to have existed for the prior art patentee to copolymerize the intermediate molecular weight copolycarbonates of the present invention. Very low molecular weight sulfide-based polycarbonates have been disclosed by Smirnova et al in Vysckomolekuliarlyne Seyed A10: No. 1 96-101,1968. These do not share the impact performance (high critical thickness values) of the presently disclosed resins and have apparently been used in laboratory studies concerning crystallization.

Combining high melt flow rates, characteristic of low molecular weight, and excellent mechanical and chemical properties, associated with bisphenol-A based polycarbonates, these copolymers are particularly attractive where processing at lowered temperatures is desired.

It is thus the surprising and unexpected findings of the present invention that a copolycarbonate of low molecular weight is associated with both easy moldability and excellent mechanical properties which have hitherto been associated with high molecular weight resins which are more difficult to mold.

For instance, a homopolycarbonate having a critical thickness of 234 mils is of high molecular weight and its melt flow rate is of the order of 2.1 g/10 min., a rate indicative of difficult moldability; easier to mold resins, of melt flow rate in the order of 23.1 g/10 min., a consequence of a low molecular weight, have a critical thickness of only about 155 mils.

In contrast to these homopolycarbonates where the mechanical properties need to be compromised if moldability is desired, the copolycarbonates of the instant invention combine both attributes. A low molecular weight copolycarbonate of thiodiphenol of a melt flow rate about 23.9 g/10 min. exhibits a critical thickness of about 239 mils.

This desirable combination of properties is recognized in the present invention to afford lowered process temperature and the attendant fast molding cycle. Further recognized in the invention is the improvement in the molding of thin parts at conventional processing temperatures and the avoidance of thermal degradation encountered upon high temperature processing.

Because of the inherent high viscosity of commercial polycarbonates their processing, i.e., molding, is carried out at temperatures higher than 600° F. Molds having complicated pattern or ones having thin cavities present particular difficulties because the resin often stops its flow before completely filling the mold and the operator electing to overcome this problem by raising the process temperature runs the risk of thermally degrading the resin.

The present invention offers an attractive solution in that the desirable properties of high molecular weight polycarbonates are made available in the form of a low molecular weight resin which is moldable at less than 500° F. and preferably lower than 485° F. Thin, 20 mils, and as low as 5 mils or less, and complicated parts can now be molded at sufficiently low temperatures thus avoiding the risk of thermal degradation.

The invention will be further described by illustration in the following examples.

EXAMPLE 1

A copolycarbonate resin was prepared by reacting a mixture of the disodium salts of bis-2-(4-hydroxyphenyl)-propane (bisphenol-A) and 4,4'-thiodiphenol with phosgene in accordance with the interfacial polycondensation synthesis hereinbefore discussed. The weight percent ratio of bisphenol-A to 4,4'-thiodiphenol was 4 to 1. The copolycarbonate was tested for physical and mechanical properties with the test results reported in Table I.

EXAMPLES 2 AND 3

Example 1 was repeated except that the weight percent ratio of bisphenol-A to 4,4'-thiodiphenol was 3 to 1. The polymers had different degrees of polymerization such that the melt flow rates of the two polycarbonate resins differed from each other. The copolycarbonates were tested for physical and mechanical properties with the test results reported in Table I.

TABLE I

| Example No. | 1 | 2 | 3 | control[b] |
|---|---|---|---|---|
| wt. % TDP[a] | 20 | 25 | 25 | 0 |
| Melt flow rate [c] g/10 min. | 16.0 | 16.1 | 23.9 | 2.9 |
| Notched Izod Impact[d] ft.-lb./in. | | | | |
| ⅛", molded at 550° F. | 12.31 | 11.61 | 10.97 | 18.0 |
| ⅛", molded at 700° F. | 12.02 | 11.33 | 11.26 | — |
| ¼", molded at 550° F. | 3.10 | 6.76 | 3.71 | 2.8 |
| Critical thickness, mils | 225 | 247 | 235 | 225 |
| Dart drop[e] (ft.-lbs) | 107 | 107 | 107 | 107 |
| Heat distortion temperature °C. at 264 psi | 130.4 | 128.2 | 129.4 | 136.0 |

[a]TDP = 4,4'-thiodiphenol
[b]control is a bisphenol-A homopolycarbonate
[c]ASTM D-1238, at 300° C.
[d]ASTM D-256
[e]One inch diameter dart, dart weighes 10 lbs.,specimen thickness 0.1"

As can be seen in Table I the polycarbonates which are prepared using 20%, or more, thiodiphenol exhibit high melt flow rates, indicative of excellent processability and maintain physical properties at comparable levels to these of bisphenol-A homopolycarbonate of a significantly lower melt flow rate.

EXAMPLE 4

A copolycarbonate resin was prepared according to Example 1 except that the weight ratio of bisphenol-A to thiodiphenol was 3 to 1, and its melt flow rate was 23.7 g/10 min (ASTM D-1238 at 300° C.). The resin was injection molded to form a part having a thin wall section of 7 mils. The resin readily filled the mold and the article prepared thereby had excellent chemical and physical properties.

Further, it has been found that polycarbonates having critical thicknesses of 200 mils or greater, and preferably 225 mils or greater, can be prepared having weight percent thiodiphenols incorporated therein at levels of greater than 20 weight percent thiodiphenol to obtain polycarbonate resins having melt flow rates of 15 to 30 g/10 min. These copolycarbonate resins provide polycarbonates which have substantially the same physical properties as higher molecular weight homopolycarbonates, i.e., those having melt flow rates as low as about 1.

EXAMPLE 5

A copolycarbonate resin similar to that of Example 1, except that the weight ratio of bisphenol-A to 4,4'-thiodiphenol was 3:1, is compared at Table II to a homopolycarbonate in terms of processability. A specially designed mold wherein the flow length could be measured was used in that comparison. All experiments were conducted under the following injection molding conditions.

| | |
|---|---|
| Injection pressure | 21,050 psi |
| Injection velocity | 2.3 inch/sec. |
| Mold temperature | 200° F. |
| Cushion | 0.05 to 0.100 inch |

TABLE II

| Material | Melt Temperature | Flow Length | Std. Dev. | Number of Runs |
|---|---|---|---|---|
| Polycarbonate-homopolymer (melt flow rate - 2.1, critical thickness 225 mils) | 626° F. | 15.69 | 0.12 | 25 |
| Copolycarbonate (melt flow rate-22.6, critical thickness 235 mils) | 550° F. | 31.17 | 0.28 | 26 |
| | 515° F. | 19.45 | 0.08 | 26 |
| | 485° F. | 13.31 | 0.09 | 25 |

EXAMPLES 6 TO 9

The relationships between the impact strength, critical thickness, melt flow rate and thiodiphenol content were studied using copolycarbonates prepared in accordance with the procedure outlined above. Table III provides a summary of these relations.

TABLE III

| Example No. | 6 | 7 | 8 | 9 |
|---|---|---|---|---|
| TDP content wt. %[a] | 25 | 30 | 30 | 40 |
| Melt flow rate[b] | 16.1 | 15.6 | 22.9 | 29.0 |
| Notched Izod Impact strength[c] (ft.-lbs/in) | | | | |
| ⅛" | 11.61 | 12.17 | 10.99 | 10.50 |
| ¼" | 6.54 | 11.61 | 11.12 | 8.70 |
| Critical thickness (mils) | 247 | >255 | >255 | >255 |

[a]TDP = 4,4'-thiodiphenol
[b]ASTM D-1238 at 300° F.
[c]ASTM D-256

Thus, although the invention has been described with respect to specific materials and specific processes, it is only to be limited so far as is set forth in the accompanying claims.

What is claimed is:

1. A copolycarbonate resin comprising the reaction product of at least one aromatic dihydroxy compound, a carbonic acid derivative and a thiodiphenol, said thiodiphenol comprising 20 to 40% relative to the total weight of said dihydroxy compound and said thiodiphenol, said resin characterized by
   (i) having a melt flow rate of at least 15 g/10 min. at 300° C., and
   (ii) having a critical thickness greater than 200 mils, and
   (iii) having its processing temperature below 500° F.

2. A copolycarbonate resin of claim 1, wherein said melt flow rate is between 15 and 30 g/10 min. at 300° C.

3. A copolycarbonate resin of claim 1, wherein said critical thickness is greater than 220 mils.

4. The resin of claim 1 wherein said aromatic dihydroxy compound is bis-2-(4-hydroxyphenyl)-propane.

* * * * *